Figure 1:
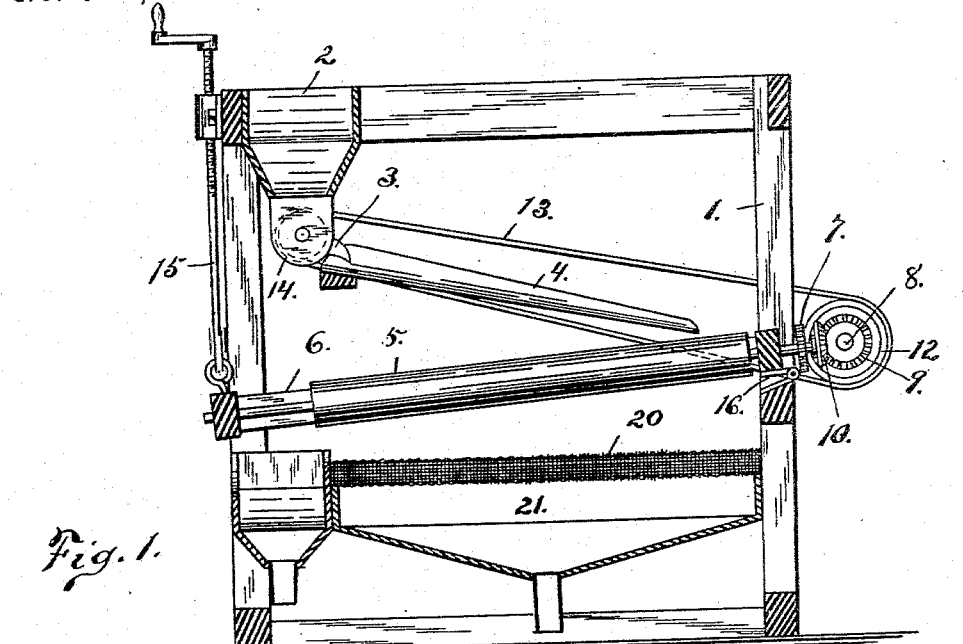

(No Model.)

E. KNAPP.
BEAN SEPARATOR.

No. 515,776. Patented Mar. 6, 1894.

WITNESSES:
Otto E. Hoddick.
Robert P. Wightman.

INVENTOR
Edgar Knapp.
BY W. T. Miller
ATTORNEY

UNITED STATES PATENT OFFICE.

EDGAR KNAPP, OF MIDDLEPORT, NEW YORK.

BEAN-SEPARATOR.

SPECIFICATION forming part of Letters Patent No. 515,776, dated March 6, 1894.

Application filed February 6, 1891. Serial No. 380,539. (No model.)

*To all whom it may concern:*

Be it known that I, EDGAR KNAPP, a citizen of the United States, residing at Middleport, in the county of Niagara and State of New York, have invented certain new and useful Improvements in Bean-Pickers; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention is directed to the production of organized means for mechanically picking and sorting beans and similar seed as they come from the thrashing machine or flail, mixed with dirt, stones and other foreign matters, for the purpose of separating the good and perfect beans from the blighted, bad and broken beans, the dirt, stones and other foreign matters. So far as I know and can find this separation has been effected by hand picking, entailing much time and expense and effecting more or less imperfect separation.

My invention comprehends a machine for doing this hand work mechanically, and wherein the picking is not only effected with greater speed, but with more perfect separation of the good beans from the bad beans and thereby greatly reduce the cost of the picking and increase the marketable conditions of both the good and the bad beans by a more effective cleaning action which tends to clean, polish and brighten them, and which is not accomplished by hand picking.

Primarily my invention comprehends a mechanical picker wherein the beans are treated and picked in their passage over a platform or surface comprising one or more pairs of rubber rolls having unbroken surfaces, arranged in relatively fixed bearings, transversely in horizontal planes, on a downward longitudinal inclination and revolved in oppositely inward directions, and wherein each pair of rolls is provided with a conduit adapted to deliver the beans at their upper ends and mediately thereof, whereby the beans are dropped upon the rolls, the yielding surfaces whereof, act to grip and seize the rotten, blighted and broken beans by reason of their rough surfaces, and carry them down between the rolls; while the good beans, by reason of their smooth, sound and clean sides, are in condition to and do slip over the roll surfaces and slide down thereon in the holding trough formed by and between the rolls and pass off at their lower ends.

Before specifying the claims of my invention I will describe the organized machine which is illustrated in the annexed drawings, showing a structure embodying the several features of my invention in combination.

Figure 2:
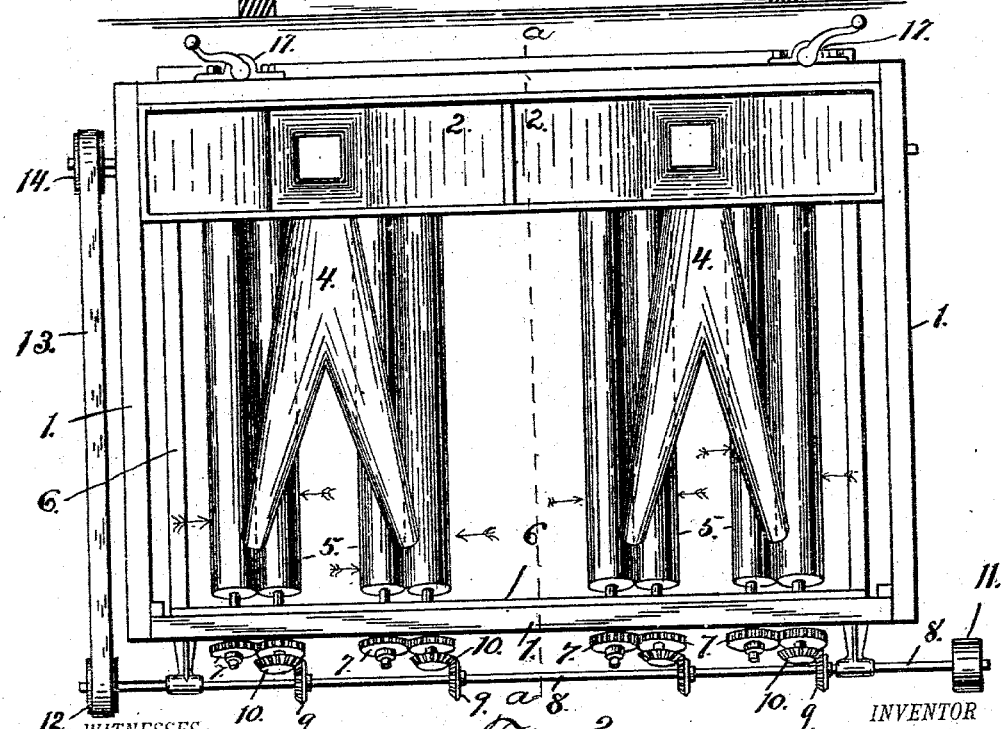

In the drawings Figure 1 is a vertical cross-section taken through the center $a$, $a$ of my improved bean picker. Fig. 2 is a top plan view of the same.

Referring to the drawings: 1. is the frame having arranged thereon the hopper 2. for the reception of the beans. These beans pass down to the bottom of the hopper where they are fed to the troughs or conduits 4. through the spouts 3. A separate spout and conduit might be arranged for each pair of rollers but I have herein shown a dividing conduit so as to feed two sets of rollers from the same spout or feed. The conduits leading from the hopper across the machine assists in more evenly distributing the beans passing through them. The beans pass from the conduits to the upper ends of the rollers, 5. as shown in the drawings. These rollers are preferably made of rubber and are mounted in a frame 6 which is hinged at one side as at 16 the opposite side being secured to the vertical rods 15 which pass through the threaded sleeves 17. By this means I am enabled to place the rollers at any desired angle that the quality or the condition of the beans may warrant. The rollers being arranged in pairs as shown are connected at one end by the gear wheels 7. and set in motion from the main shaft 8. by the bevel gears 10. and 9. The feed arrangement in the bottom of the hopper may be of any well known form and is connected to the main shaft by the belt 13. passing over the pulleys 12. and 14. whereby the feed of the beans from the hopper upon the conduit will be in the proper ratio to the speed of the descent of the beans down the picking rolls. For this purpose the pulleys are of such relative size as shown, as to cause the beans to be fed from the hopper so that they will pass from the conduit in the proper ratio to their descending movement on the rolls, and, it will be understood that the speed of this movement is governed by the degree of inclination of the rolls. As the beans fall upon the rollers 5. the good beans on account of their smooth surfaces slide or pass down to the lower end of the rollers while the dirt and bad beans pass between the rollers which revolve in opposite directions and toward each other. As the dirt and bad beans pass through the rollers they fall upon an inclined sieve 20 through which the dirt passes falling to the floor; the dirt having been crushed in passing through the rollers while the bad beans bolt along the inclined screen or sieve 20 and fall into the hopper 21. The bad beans in passing over the sieve or screen 20 are greatly improved thereby and bring much better prices in the market.

The angle formed by the two rolls resting against one another form an important feature in my invention this angle being regulated by the diameters of the rolls employed. Pneumatic rolls might be employed and their centers so arranged as to be adjustable to and from one another, but I prefer the solid rolls of different diameters as the size and condition of the beans may require.

The picker shown in drawings may be operated from the pulley 11, or a lever arm could be arranged on the main shaft 8, should it be desired to operate the machine by hand.

It will be understood that the beans are delivered from the conduit practically from a moving line or row so as to drop therefrom between each pair of rolls at their upper ends so that they will descend the trough formed by and between the rolls in a close line whereby each bean is caused to rest against others and the surfaces of the rolls so that in their downward sliding movement all those beans which may be blighted and have rough and broken surfaces will be caused to adhere or stick to the rubber surface of one or of both rolls and will thereby be drawn down between and through the rolls. The other beans in the line will, by reason of their smooth and perfect condition, have a sort of repellant sliding action on the rolls in their descent down the trough and will therefore, pass off at the lower ends of the rolls. This action has the effect of cleaning and brightening the beans because their sliding movement down the rolls and the revolving action of the rolls against the sides of the beans together will produce a rubbing action in two directions on the sides of each bean which tends to enhance their appearance and salable quality. In this operation it is plain that any other rough and broken substances, and the dirt and pieces of pods will also be bolted down between the rolls. In this operation it is plain that the rolls must be arranged transversely on a horizontal plane to form the holding trough for the beans; that the bearings of the rolls must be relatively fixed because, to permit of their separation would tend to defeat the gripping and seizing function of the rolls; and would also have the effect of letting the good beans pass down with the bad ones; that the rolls must be practically formed of solid rubber, because it is the function of indenting their walls or surfaces by the bodies passing between them that is essential to the picking operation.

It is evident that the size of the holding trough must be sufficient for the largest beans to prevent them bouncing out over the trough; but for beans that run small a too large trough would tend to carry the whole line through the rolls. The size of the trough is therefore, regulated by the size of the rolls. A size of rolls for satisfactory working is between an inch and a quarter and two inches in diameter; while the density of the rubber is about 294°; and the speed of the rolls is seventy-five or eighty revolutions a minute, and it is essential to their proper operation that the surfaces of the rolls shall be unbroken, perfectly smooth and cylindrical and fairly hard. It is also evident that the rolls operate with a sorting function in separating the small beans from the large ones by reason of the tendency of the machine to grip any beans that lie down low in the angular space between the rolls.

To render the cleaning, separating and sorting action of the rolls effective and satisfactory under all conditions and sizes of the beans and the presence therewith of dirt and stones, I prefer to gear them to be driven inwardly with equal rotative force and speed so as to bolt through them, by a positive gripping action, all the bad beans, stones and rough substances. For this purpose I gear each pair of rolls together by pinions on the journals at their upper ends and I connect each pair of rolls to a line shaft by bevel gear on the latter connecting with bevel gear on the journal of one of each pair of rolls, so that all the rolls are driven from the same shaft which also drives the hopper feed regulating device. The regulation of the feed of the beans delivers them from the hopper one by one upon the rolls so that they must travel down between the rolls to be independently rubbed and acted upon by both rolls alike. In this operation the beans are fed in continuous separate streams from a supply hopper, upon and down along rubber rolls, from the ends of which the good beans are delivered in cleaned condition, while the bad beans are picked out all along the moving lines and drawn between, by and dropped beneath the rolls as separate products.

I claim—

1. In a machine for picking and sorting beans, an inclined picking platform or surface comprising one or more pairs of rubber rolls having unbroken surfaces, arranged in relatively fixed bearings, transversely in a horizontal plane, on a downward longitudinal inclination and revolved in oppositely inward directions, in combination with a suitable conduit adapted to deliver the beans to said rolls at their upper ends and mediately thereof, whereby the beans are dropped upon the rolls and are picked as they slide down thereon in the way described.

2. A bean separator consisting of a main frame, one or more bean-supply hoppers, a plurality of pairs of adjacent and oppositely-revolving inclined rollers, a frame in which said rollers have bearing, said frame being at one end hinged to the main frame and at its other end having means, substantially as described, for regulating the angularity of said roller-supporting frame and of the rollers carried thereby, a forked conduit extending angularly downward from the hopper spout to the upper ends of said rollers, the forks of said conduit discharging the beans mediately on the respective pairs of rollers, an inclined sieve or screen, and a receiving hopper located below said rollers and mechanism, substantially as described, for connecting and actuating the operative parts of the separator, substantially as and for the purpose set forth.

3. A bean separator consisting of a main frame, a hopper, a plurality of angularly-adjustable inwardly-revolving elastic rollers arranged in pairs, a downwardly-inclined forked or bifurcated conduit registering at its upper end with the hopper spout, its lower forked end being, as set forth, located above the upper ends of and mediately of the respective pairs of rollers whereby the beans will be delivered to the upper ends of said rollers, the dirt and defective beans drawn between said rollers, the perfect beans permitted to slide down said rollers as explained, and an inclined sieve located below said rollers, for the purpose of separating the dirt and defective beans and bolting the latter, all substantially as set forth.

4. In a machine for picking and sorting beans, an inclined platform or picking surface composed of a rigid frame having one or more pairs of unbroken surfaced rubber rolls arranged in relatively fixed bearings, in a transverse horizontal plane on a downward inclination and revolved positively in oppositely inward directions, in combination with a conduit arranged to deliver the beans mediately to the upper ends of each pair of rolls and a hopper having a bottom feed device and a discharge spout for each conduit, substantially as described.

5. In a machine for picking and sorting beans, picking rolls formed of rubber having unbroken surfaces, arranged in pairs in relatively fixed bearings, in a horizontal transverse plane and on a downward longitudinal inclination, in combination with gearing for operating the rolls in pairs in opposite inward directions, a conduit arranged to deliver the beans in a row at the upper ends and mediately of each pair of rolls, and a hopper for containing the beans having suitable discharging devices, whereby the rough bad beans are separated from the smooth good beans in the way described.

6. In a machine for picking and sorting beans, an inclined picking platform surface comprising one or more pairs of rubber rolls having unbroken surfaces arranged in relatively fixed bearings, transversely in a horizontal plane and on a downward incline longitudinally, in combination with gearing for revolving said rolls in oppositely inward directions, a conduit arranged to deliver the beans in a line or row mediately to the upper ends of each pair of rolls, a hopper having a bottom feed device and a discharge, and suitable connections for operating the hopper feed device from the roll operating gearing for the purpose of governing the feed from the conduit in the proper ratio to the movement of the beans down the rolls.

7. In a machine for picking and sorting beans, an inclined picking platform or surface comprising one or more pairs of rubber rolls having unbroken surfaces, arranged in relatively fixed bearings, transversely in a horizontal plane and on a downward incline longitudinally, in combination with gearing for revolving said rolls in oppositely inward directions, a conduit arranged to deliver the beans in a line or row mediately to the upper ends of said rolls, a hopper having a bottom feed device and a discharge spout, suitable gearing connections for operating the hopper feed device from the roll operating gearing, and suitable means whereby to adjust the downward inclination of the rolls, for the purpose described.

8. A machine for picking and sorting beans, comprising a main frame, an adjustable inclined frame supported in the main frame, one or more pairs of rubber rolls mounted in the inclined frame, a hopper above the rolls, a feed wheel in the lower portion of the hopper adapted to deliver the beans mediately upon the upper ends of the rolls, and mechanism substantially such as described for positively rotating said rolls in oppositely inward directions, to effect the separation and sorting of the beans in the way described.

9. A machine for picking and sorting beans, comprising a main frame, an inclined frame supported in the main frame, one or more pairs of rubber rolls mounted in the inclined frame, a hopper above the rolls, a feed regulating device in the hopper, a spout or conduit for each feed device delivering the beans upon the rolls, and means for rotating the rolls, substantially as described.

10. As an improvement in the art of separating good and defective beans, a machine comprising a picking platform constructed of a series of rubber rolls arranged in pairs, having unbroken surfaces, in relatively fixed bearings, transversely in horizontal planes, on a downward longitudinal inclination, means for revolving said rolls in oppositely inward directions, and a feed device for delivering the beans in continuously regulated rows mediately upon the upper ends of the rolls, whereby the bad beans, stones and the like are picked and separated from moving rows, and expelled beneath the rolls, substantially as described.

11. In a bean picker and separator, the combination of a main frame and inclined frame, of compressible rolls mounted in the inclined frame, a hopper supported above the inclined rolls, a feed-wheel revoluble under the hopper and adapted to receive beans therefrom and deliver the same upon the rolls, and means for operating the feed-wheel from the roll operating gearing, substantially as described.

In testimony whereof I have signed my name to this specification in the presence of two subscribing witnesses.

EDGAR KNAPP.

Witnesses:
OTTO E. HODDICK,
GEORGE S. HELENBOLT.